(12) United States Patent (10) Patent No.: US 12,609,034 B2
Nardin (45) Date of Patent: Apr. 21, 2026

(54) APPARATUS FOR CHARGING A VEHICLE WITH ELECTRICITY

(71) Applicant: Alberto Nardin, Regina (CA)

(72) Inventor: Alberto Nardin, Regina (CA)

( * ) Notice: Subject to any disclaimer, the term of this patent is extended or adjusted under 35 U.S.C. 154(b) by 0 days.

(21) Appl. No.: 18/624,784

(22) Filed: Apr. 2, 2024

(65) Prior Publication Data

US 2024/0321108 A1    Sep. 26, 2024

Related U.S. Application Data

(63) Continuation of application No. 18/405,385, filed on Jan. 5, 2024, which is a continuation-in-part of application No. 17/587,335, filed on Jan. 28, 2022, now Pat. No. 11,922,811.

(60) Provisional application No. 63/184,502, filed on May 5, 2021, provisional application No. 63/144,098, filed on Feb. 1, 2021.

(51) Int. Cl.
| | |
|---|---|
| *B60L 53/16* | (2019.01) |
| *B60L 53/12* | (2019.01) |
| *B60L 53/60* | (2019.01) |
| *G06F 3/041* | (2006.01) |
| *G06F 3/0485* | (2022.01) |
| *G06F 3/04883* | (2022.01) |
| *G06V 20/62* | (2022.01) |
| *G08G 1/16* | (2006.01) |

(52) U.S. Cl.
CPC .............. *G08G 1/168* (2013.01); *B60L 53/12* (2019.02); *B60L 53/16* (2019.02); *B60L 53/60* (2019.02); *G06F 3/0412* (2013.01); *G06F*

*3/0485* (2013.01); *G06F 3/04883* (2013.01); *G06V 20/625* (2022.01); *G06F 2203/04806* (2013.01)

(58) Field of Classification Search
None
See application file for complete search history.

(56) References Cited

U.S. PATENT DOCUMENTS

| | | | | |
|---|---|---|---|---|
| 2013/0169227 | A1* | 7/2013 | Tremblay | B60L 53/305 |
| | | | | 320/109 |
| 2013/0257373 | A1* | 10/2013 | Mallon, IV | F16L 3/16 |
| | | | | 248/65 |
| 2014/0111158 | A1* | 4/2014 | Kinomura | B65H 75/4486 |
| | | | | 320/109 |
| 2017/0274786 | A1* | 9/2017 | Eisner | B60L 53/68 |
| 2018/0339601 | A1* | 11/2018 | Kruszelnicki | B60L 53/16 |

(Continued)

*Primary Examiner* — John F Mortell

(74) *Attorney, Agent, or Firm* — Adrian D. Battison; Ryan W. Dupuis; Ade & Company Inc.

(57) ABSTRACT

An apparatus for charging a vehicle includes a housing mounted on an upstanding post affixed to the ground and an electrical outlet having a charging system with a connecting lead and a charging head for connection to the vehicle. The connecting lead is mounted and contained within a hollow interior of the post and includes including a lead supply device or reel at the base of the post for supplying a length of the connecting lead for movement of the charging head from a storage position at the post to charging position at the vehicle. The storage position is located at an opening adjacent a front face of the housing and can be pulled manually or can be carried on an arm which can move the charging head to the charging position on the vehicle. The reel can be mounted within a container under the base of the post.

9 Claims, 4 Drawing Sheets

(56) References Cited

U.S. PATENT DOCUMENTS

| 2021/0188107 A1* | 6/2021 | Keefover | ................ | B60L 55/00 |
| 2022/0001761 A1* | 1/2022 | Cole | .................... | G06V 10/143 |
| 2022/0063434 A1* | 3/2022 | King, Jr. | ............... | H02J 7/0031 |

* cited by examiner

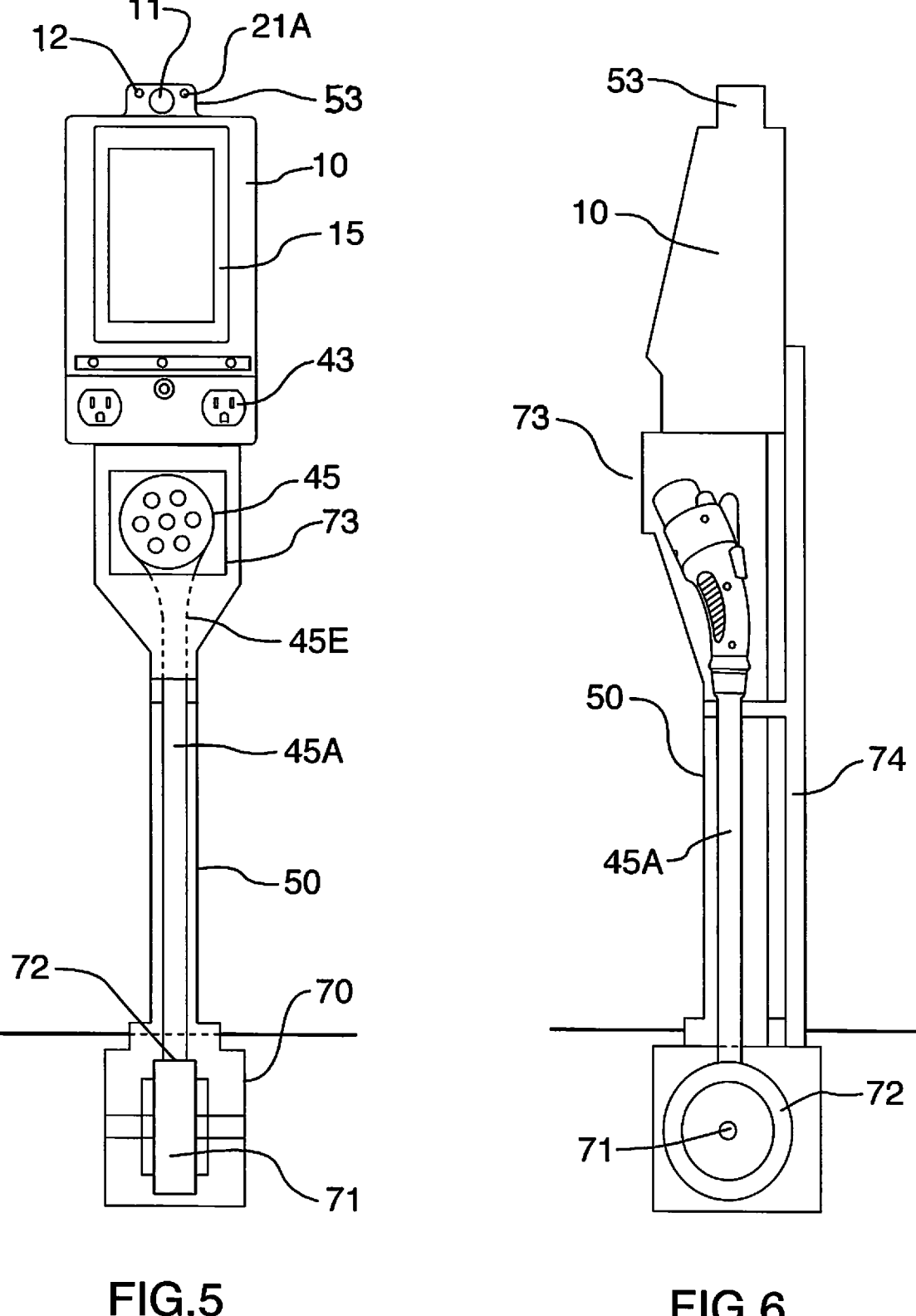
FIG.5          FIG.6

APPARATUS FOR CHARGING A VEHICLE WITH ELECTRICITY

This application is continuation of application Ser. No. 18/405,385 filed Jan. 5, 2024.

This invention relates to an apparatus for charging a vehicle.

SUMMARY OF THE INVENTION

According to a first aspect of the invention there is provided an apparatus for charging a vehicle with electricity comprising:

a housing constructed and arranged so as to be mounted at a mounting point adjacent the vehicle;

the housing being mounted on an upstanding post having a post base arranged to be affixed to a support surface adjacent the vehicle;

and an electrical outlet having a charging system with a connecting lead and a charging head for connection to a battery of the vehicle;

the connecting lead being mounted and contained within the post;

the connecting lead including a lead supply device at the post for supplying a length of the connecting lead for movement of the charging head from a storage position at the post to charging position at the vehicle.

In accordance with another feature which can be used with any other feature herein, the storage position is located at an opening raised from the post base and adjacent a front face of the housing.

In accordance with another feature which can be used with any other feature herein, the charging head is carried on an arm which can move the charging head to the charging position on the vehicle.

In accordance with another feature which can be used with any other feature herein, the cable is supplied by a reel.

In accordance with another feature which can be used with any other feature herein, the reel is mounted within a container under the base of the post.

In accordance with another feature which can be used with any other feature herein, the control system includes a usage meter for detecting an amount of electrical energy used in charging the battery.

In accordance with another feature which can be used with any other feature herein, the control system communicates with the usage meter for measuring an amount of electricity consumed and controls an amount the customer pays.

In accordance with another feature which can be used with any other feature herein, the electric outlet includes 3-way supply for: an AC voltage outlet, a 110 v electric vehicle (EV) charger outlet and a 220 v EV charger outlet.

In accordance with another feature which can be used with any other feature herein, the 3-way supply includes a Tesla Supercharger adapter.

In accordance with another feature which can be used with any other feature herein, the connecting lead is connected to and extends from the housing to the outlet coupling and includes a support for the lead.

In accordance with another feature which can be used with any other feature herein, the support comprises a support bracket over which the lead is draped.

In accordance with another feature which can be used with any other feature herein, the control unit is arranged to physically and automatically enable EV charging for a vehicle by way of a robotic arm arranged to operate the connecting lead and the outlet coupling so as to extend, attach, charge, detach and retract automatically.

In accordance with another feature which can be used with any other feature herein, the apparatus includes an in-ground hidden charging cable.

Also disclosed herein is an apparatus for controlling parking in parking stall accessible to an authorized user comprising:

a housing constructed and arranged so as to be mounted at a mounting point adjacent the parking stall;

a camera mounted on the housing arranged to take images of a vehicle entering the parking stall;

a sound broadcasting device on the housing for broadcasting information to the to the vehicle;

a reader which is responsive to a component of a vehicle to determine if the vehicle is authorized to park in the parking stall;

a control system in the housing;

the control system including a communication system arranged for communication with the authorized user;

the control system being arranged, when presence of a vehicle is detected, to determine authorized use or unauthorized use by the vehicle;

and an electrical outlet having a charging system with a connecting lead and an outlet coupling for connection to a battery of an electric vehicle.

Preferably the control system includes a usage meter for detecting an amount of electrical energy used in charging the battery.

Preferably the control system communicates with the usage meter for measuring an amount of electricity consumed and controls an amount the customer pays upon exiting the parking stall.

Preferably the electric outlet includes 3-way supply for: an AC voltage outlet, a 110 v electric vehicle (EV) charger outlet and a 220 v EV charger outlet.

Preferably the 3-way supply includes a Tesla Supercharger adapter.

Preferably the connecting lead is connected to and extends from the housing to the outlet coupling and includes a support for the lead.

Preferably the support comprises a support bracket over which the lead is draped.

Preferably the support comprises a reel for winding in and releasing the lead.

Preferably the control unit is arranged to physically and automatically enable EV charging for a vehicle by way of a robotic arm.

Preferably the control unit is arranged to operate the connecting lead and the outlet coupling so as to extend, attach, charge, detach and retract automatically.

In an arrangement including an in-ground hidden charging cable, there are actually 2 such versions. One arrangement includes the automatic ejection of the connector head to be grabbed by the hand of the operator and then physically plugged by hand into the electronic vehicle (EV). The other arrangement includes the charger cable as part of a robotic arm which automatically extends and plugs into the EV, then automatically retracts either when charging is complete or on demand from the APP. The EV is required to have an appropriate charger receptacle to cooperate with this arrangement.

In another arrangement there can be provided components for wireless charging of EV batteries for example by induction, microwave or laser. The charging port of the system provided for the traditional charging cable using the control module on the EV as the receiver can also be used for a transducer supplying the output energy using an induction coil or the microwave or laser transmitter. The location of the wireless transducer or power emitter is physically separate from the main housing unit, and can for example be mounted on the parking stall as a ground pad directly underneath the car. These types of wireless chargers are currently being tested by companies such as Qualcomm, BMW, and others. The power emitter is electrically connected to the housing unit and the two units communicates wirelessly.

Also disclosed herein there is provided an apparatus for controlling parking in parking stall accessible to an authorized user comprising:

a housing constructed and arranged so as to be mounted at a mounting point adjacent the parking stall;

a camera mounted on the housing arranged to take images of a vehicle entering the parking stall;

a sound broadcasting device on the housing for broadcasting information to the to the vehicle;

a reader which is responsive to a component of a vehicle to determine if the vehicle is authorized to park in the parking stall;

a control system in the housing;

the control system including a communication system arranged for communication with the authorized user;

the control system being arranged, when presence of a vehicle is detected, to determine authorized use or unauthorized use by the vehicle;

and a light projector system which projects at least one line on the ground at the parking stall displaying on the ground an extent of the parking stall.

Preferably the light projector system projects two distinct lines on the ground at the parking stall displaying ends of the parking stall.

Preferably the projection is extremely useful when there are no defined parking stall lines due to: paint deterioration, snow coverage, gravel or unpaved areas where no lines exist.

Preferably there is provided at least one colored LED for use as a warning signal.

Preferably there is provided at least one infrared LED for the camera for enhancing night vision.

Also disclosed herein there is provided an apparatus for controlling parking in parking stall accessible to an authorized user comprising:

a housing constructed and arranged so as to be mounted at a mounting point adjacent the parking stall;

a camera mounted on the housing arranged to take images of a vehicle entering the parking stall;

a sound broadcasting device on the housing for broadcasting information to the to the vehicle;

a reader which is responsive to a component of a vehicle to determine if the vehicle is authorized to park in the parking stall;

a control system in the housing;

the control system including a communication system arranged for communication with the authorized user;

the control system being arranged, when presence of a vehicle is detected, to determine authorized use or unauthorized use by the vehicle;

the apparatus being arranged for use with an autonomous vehicle where the communication system is arranged for communication with a control unit of the autonomous vehicle;

wherein the control system is arranged to provide instructing communications to the control unit of the autonomous vehicle for location of the autonomous vehicle within the parking stall.

Preferably n the control unit is arranged to provide instructing communication for slowly guiding the autonomous vehicle to be accurately lined up within the parking stall.

Preferably the control unit is arranged to use AI and other built-in sensors communicate with the autonomous car's on-board computer enabling a perfectly, physically aligned park within the stall parameters. Without this feature, the autonomous car might park too much to one side or the other possibly creating a hazard when opening a door. Furthermore, the programing might purposely align the autonomous car more to one side of the stall to avoid an obstacle or similar on the other side.

Also disclosed herein there is provided an apparatus for controlling parking in parking stall accessible to an authorized user comprising:

a housing constructed and arranged so as to be mounted at a mounting point adjacent the parking stall;

a camera mounted on the housing arranged to take images of a vehicle entering the parking stall;

a sound broadcasting device on the housing for broadcasting information to the to the vehicle;

a reader which is responsive to a component of a vehicle to determine if the vehicle is authorized to park in the parking stall;

a control system in the housing;

the control system including a communication system arranged for communication with the authorized user;

the control system being arranged when presence of a vehicle is detected, the control system is arranged to determine authorized use or unauthorized use by the vehicle;

wherein the housing includes a video screen for displaying information to an occupant of the vehicle.

Preferably the control unit is arranged to display on the video screen anyone or more of a QR Code, a large "green checkmark" when authorized to park or a large "red X" when not authorized and streaming advertisements.

Preferably the video screen is also a touchscreen with 2-finger zoom and scrolling.

Preferably the programmed artificial intelligence includes real-time video playback simultaneously on the screen plus on the APP. This video is utilized as a security measure when a person is detected in the parking space, but not for the purpose of parking a vehicle.

The arrangement disclosed herein further includes an apparatus for controlling parking in a parking stall accessible to an authorized user, the apparatus comprising:

a housing for mounting at a mounting point adjacent the parking stall;

a camera mounted in the housing arranged to take images of a vehicle when driven by a driver for entering the parking stall;

a tiny motherboard for computing, with on-board wireless connectivity;

a SIM (Subscriber Identity Module) smart card reader;

a device for broadcasting an audible message to the driver;

at least one proximity sensor and/or ultrasonic sensor arranged to detect entry of the vehicle into the parking stall;

a control system;

the control system including a communication system arranged for communication with the authorized user;

the control system being arranged so that:

when the presence of the vehicle is detected by the proximity sensor, the control system is arranged to determine authorized use or unauthorized use by the vehicle;

in response to a determination of unauthorized use, the control device is arranged to emit said audible message informing the driver of the unauthorized vehicle that the unauthorized vehicle is not authorized to use the parking stall;

to transmit user information identifying the unauthorized vehicle and to receive a signal indicating when an unauthorized use is approved.

In one preferred arrangement the control system is arranged to stream live video of the unauthorized vehicle and driver to the authorized user using the communication system.

In one preferred arrangement, after information identifying the unauthorized vehicle is transmitted to the authorized user, the driver of the unauthorized vehicle can choose to pay for parking in the stall and if agreed will receive from the authorized user a signal indicating the unauthorized use is approved.

In one preferred arrangement, in the event that no authorized use is available, the control system provides an audible message to the driver confirming this.

In one preferred arrangement the control system is arranged to transmit to the authorized user to a mobile device using a cellular network.

In one preferred arrangement the control device, in order to determine authorized use, includes a reader which is responsive to a remote FOB of an authorized vehicle. In addition or as an alternative, in order to determine authorized use, the device camera has image recognition for the option of programming recognizable images such as a license plate.

In some cases where no communication is available, the control system can operate without communicating to the authorized user.

In one preferred arrangement the control system is arranged relative to the proximity sensor to determine whether the vehicle has interrupted the sensor briefly, whether the vehicle is stationary, or whether the vehicle is getting closer to the sensor and remains stationary for a time greater than a set time.

In one preferred arrangement, when an unauthorized vehicle is in the stall, the authorized user can transmit a recorded personalized message to the unauthorized vehicle. This enables the authorized user to record a specific message which may indicate that the stall is never available or that the stall may be purchased at specific times when it can be available.

In one preferred arrangement there are provided LED lights for providing a visible a warning to the unauthorized vehicle.

In one preferred arrangement the apparatus resets itself to "ready" mode each time a vehicle exits the stall. The proximity sensor and/or a predetermined distance from the camera control this reset.

In one preferred arrangement the housing carries a readable code such as a QR code readable by a mobile device of the driver of the unauthorized vehicle for access to a web site which provides data and information relating to this particular stall.

In one preferred arrangement the apparatus is associated with a web site containing information relating to authorized use of the parking stall including this stall and any others associated with the system.

In one preferred arrangement the web site contains a data base relating to only authorized users of Handicap stalls. Once officially and verifiably part of the authorized Handicap stall user data base, a unique QR code is uploaded onto the cell phone of each user therein. All handicap stalls equipped with the apparatus are programmed to recognize each unique QR code. When an authorized handicap stall user parks in one such stall, the audible voice message instructs the user to hold their unique QR code, on their phone screen, to be visible in front of the camera on the apparatus. These instructions are also noted to each user in the Handicap stall database and on their QR code cell phone screen page. At the handicap stall, the apparatus camera captures the QR code image and, if the code is correctly verified, the alarm is disabled. If not, the alarm sounds and the unauthorized vehicle exits the stall.

In one preferred arrangement the web site is associated with a plurality of stalls each having an associated control apparatus and wherein the web site contains and provides data to a customer relating to any one or more of the associated stalls where authorized use can be purchased or otherwise made available. In this arrangement, preferably the web site contains and provides data to a customer relating to an approved time of authorized use and non-availability of authorized use of one or more stalls.

The customer is in effect the vehicle to be parked in that the vehicle can comprise an autonomous vehicle or a person-controlled vehicle. In all cases the system communicates with the on board computer and provides data to the driver interface or to the autonomous control system.

The web site and the data available on it can be used to provide information to customers looking for parking spaces as to where authorized parking stalls can be found. In this way a customer looking for space can find available space from the data base and can pre-book an available space. In one arrangement, the customer will receive a one-time-use QR code on their cell phone for use on the apparatus located at the pre-booked parking stall, within a given time period depending upon the booking reference. This system therefore makes more spaces available to persons looking for available parking and also allows the stall Owner to monetize their space when not in use.

In one preferred arrangement the web site communicates with the authorized user through an internet connection to determine whether authorized use is available.

In one preferred arrangement the web site communicates with the authorized users of a plurality of parking stalls so as to provide input by the authorized users through an internet connection of data relating to the availability for purchase of each stall and associated times of availability. In this arrangement, the web site is identified by a machine-readable code or QR code provided on the housing.

In one preferred arrangement the control system includes a short-range communication system for communication with a smart phone for control and setting and communicates with the driver of the unauthorized vehicle by voice message without using the short-range communication system.

In one preferred arrangement the control system is arranged for monitoring a plurality of parking stalls. That is for example the housing may be mounted between two stalls so as to receive information from the proximity sensor of a vehicle entering either stall and so as to communicate by the recorded messages with the driver of any vehicle entering either stall. This of course reduces hardware costs.

Preferably in one embodiment the control system is arranged to transmit to the rightful user information identifying the vehicle and to receive from the rightful user a signal indicating rightful or authorized use or unauthorized use. In this way, the authorized user can allow the approaching vehicle to enter if the driver and/or vehicle are known to the authorized user or if a payment transaction can be arranged by which the use is authorized.

Preferably in one embodiment a camera streams live video to the authorized user of the vehicle and driver to enable recognition and approval if suitable. That is, the control system can transmit to the rightful user the question via their mobile device, "Do you recognize this vehicle?".

The Parking Stall Saver including a sound/light/video version is a device mounted in a parking stall and employed to preserve a parking stall for its rightful user, hence, preventing unauthorized vehicles from parking in the stall.

Preferably in one embodiment, in order to determine authorized use, the device camera has image recognition for the option of programming recognizable images such as vehicle markings or other features of the vehicle, a license plate, when visible, for automatic parking authorization.

Preferably in one embodiment the device works by internet communications in the form of a programming application (app) when it can connect to the internet; otherwise, it works via the FOB method or by the recognition method without communicating to the authorized user.

When an unauthorized vehicle is parked in a stall where the device is employed, the device emits a very loud alarm sound, a very visible flashing red coloured LED, in the shape of an "X" lights up, a voice command politely warns the driver that the vehicle will be towed, and the camera streams live video of the driver and unauthorized vehicle. The alarm sound and lights continue until the unauthorized vehicle has been fully removed from the parking stall detection area. The device may include Face Recognition of the infringement to be communicated to the parking stall owner or authorized user. In some cases, optional messages can be sent to a towing company and on social media websites. The goal is to immediately make it clear to the unauthorized vehicle's driver to promptly remove the vehicle, and to have the vehicle removed if the transgression continues.

When the device recognizes an authorized vehicle, a very visible green coloured LED, in the shape of a "Checkmark" lights up, the alarm does not sound and there is no infringement notification video.

The camera can be constantly active, streaming live online and connected for nonstop online viewing if required. The device will have its own APP and/or online program to send constant messages and video to the authorized parking stall owner.

The proximity sensors are always active and aim outwards. In one preferred arrangement, two sensors are provided where one sensor is directed so that it aims to the right at a 60-degree angle from the wall or guard rail and the other is directed to the left at a 120-degree angle. Thus, both sensors are constantly detecting when a motor vehicle approaches from straight on, or from the left or right of the parking stall.

The sensors are programmed to determine whether a vehicle has interrupted the sensors briefly, whether the vehicle is stationary, or whether the vehicle is getting closer to the sensors and remains stationary for more than 5 seconds. As a vehicle approaches, the microprocessor determines the amount of time one or both of the proximity sensors remain in detection mode. If the vehicle or driver (if on a motorbike) contains a remote FOB with the proper code to match the remote FOB receiver inside the device, then the device will remain silent and allow the authorized vehicle to park.

If an unauthorized vehicle, that is there is no recognition of a properly coded remote FOB, in the path of both sensors remains stationary for a suitable period of time for example more than 5 seconds, and has entered into a zone within a suitable distance such as of the order of 2 metres of the sensors, the device, through the APP, sends a live video stream to its Owner. The Owner then receives the question via their mobile device, "Do you recognize this vehicle?". The Owner then chooses YES or NO. If YES, then no activation of the alarm on the device. If NO, the red "X" LED flashes, the APP sends an alarm notice to the parking stall owner, and the speaker emits a loud alarm sound. The alarm will be loud enough for the driver of the vehicle to hear even while inside the vehicle with the windows closed, this will then deter the driver from remaining in the parking stall. The speaker will also announce that live video is being streamed to the owner of the stall and to the tow company.

The Owner also has a programmable option for the "Do you recognize this vehicle?" stage, wherein the answer can be set to "YES" or "NO" for a pre-set duration of time. This option is useful on occasions when the Owner cannot reply to the APP when notified. If either "YES" or "NO" are NOT entered within 10 seconds of receiving the notification, the default answer is "NO". Remotely, via the internet, or onsite via Bluetooth, the Owner can, at any time, turn the device alarm ON or OFF, or permit parking via payment acceptance.

The device recognizes authorized vehicles if and when a properly coded remote FOB is within a suitable distance, such as of the order of 4 metres from the remote FOB receiver inside the device. This FOB is an option, but not necessary for the function of the device. If no FOB is present, the Owner will need to answer the APP or website to authorize the parking of ANY vehicle.

The device camera has image recognition for the option of programming recognizable images such as a license plate when visible, or other features of the vehicle, plus the camera can read a coded card hanging from the rear-view mirror, for automatic parking authorization used in handicap or public parking stalls. That is the system can be set up so that authorized and approved handicapped persons can receive a QR code or other identification symbol by which the camera of the device can obtain data confirming that the vehicle approaching is authorized to park at the stall concerned.

The device can also operate so that instead of an alarm sound or similar, when an unauthorized vehicle is in the stall, the owner can record a personalized message or whatever he/she chooses such as music. The recording time can be 15 or 30 seconds and repeat itself till the vehicle leaves or pays to remain. Also, like the doorbell systems used on homes, through an APP or online program the owner can talk in real time to the person in the stall in areas where wifi is available.

Yet further, a "Pay on the spot" feature can be added where an Unauthorized vehicle's owner can choose, either by way of a payment card tap feature or more preferably by way of an account previous established at the web site, to pay for parking in the stall. The payment device is linked to the authorized owner/user of the parking stall for immediate acceptance. Once again, this feature is possible when wifi is capable in the area. If no wifi is available, payment and authorization to park in the stall is pre-arranged with the Owner.

In a situation where WIFI is not available, the control unit can include a SIM Card Reader, which will allow the Owner of the stall using the device to install a spare SIM Card from his/her Cell Phone Service Supplier linked to his/her existing cell phone plan. This spare SIM card can use data from the Owner's Cell Plan in turn enabling constant internet service to the Parking Device. This service will likely be LTE or 5G depending upon signal reception strength in the given device location.

Owners of the present device can choose to be part of its entire online ecosystem to benefit monetarily. Further to the QR code directing a potential client to pay for parking, using the device allows private parking stall Owners, not just commercial parking lot landlords, to make money from people choosing to park in their private stalls In cold weather regions, the device can have an electric receptacle built-in, as part of its assembly, providing electrical power to the parking stall. Furthermore, in cold weather regions where electricity is provided in the parking stall, the hard-wired version of the device can have a heating element inside its housing to ensure proper functionality during extreme cold.

The parking apparatus can also be apparatus programmed to communicate with onboard computers of autonomous vehicles (AVs)

In this case, the apparatus coupled with the integrated cloud platform will also enable parking scenarios for fully autonomous vehicles. This will enable realization of fully autonomous parking scenarios including auto-valet parking as well as fleet management services for delivery vehicles, robo-taxis, etc.

Using a two-way handshake process, autonomous vehicles can search and retrieve available parking spots by criteria such as location, time windows and availability, price, permitted vehicle size, accessibility support (handicap parking support), perimeter security and safety, nearby amenities and other criteria that is published by the device. The internet platform, in some cases, will only offer location and meta data retrieval to preregistered devices, when the locations are available to registered vehicles or customers. The autonomous vehicle can in return permit the platform to retrieve information regarding the autonomous vehicle such as vehicle meta data (make, colour, license plate, etc) as well as occupant or payload information. At this time, the two parties can finalize the handshake for agreement on using the parking location supported by the parking apparatus. This also of course applies to the communication with a vehicle computer to provide to a driver the information relating to the availability of parking spaces.

In addition the housing of the in stall device my include one or more of the following:

-a- a light to provide illumination in the area and at the housing;

-b- a strobe light as part of the alarm to provide increased visual effect;

-c- a microphone to enable communication between the person at the device and the owner of the stall.

-d- a heating coil for the interior of the hard-wired apparatus versions for use in the exterior or unheated stalls.

BRIEF DESCRIPTION OF THE DRAWINGS

One embodiment of the invention will now be described in conjunction with the accompanying drawings in which:

FIG. 5 is a front elevational view of another embodiment of the apparatus itself for mounting at the parking stall for use in the system of FIG. 1.

FIG. 6 is a side elevational view of the apparatus of FIG. 5.

In the drawings like characters of reference indicate corresponding parts in the different figures.

DETAILED DESCRIPTION

Figure 2:
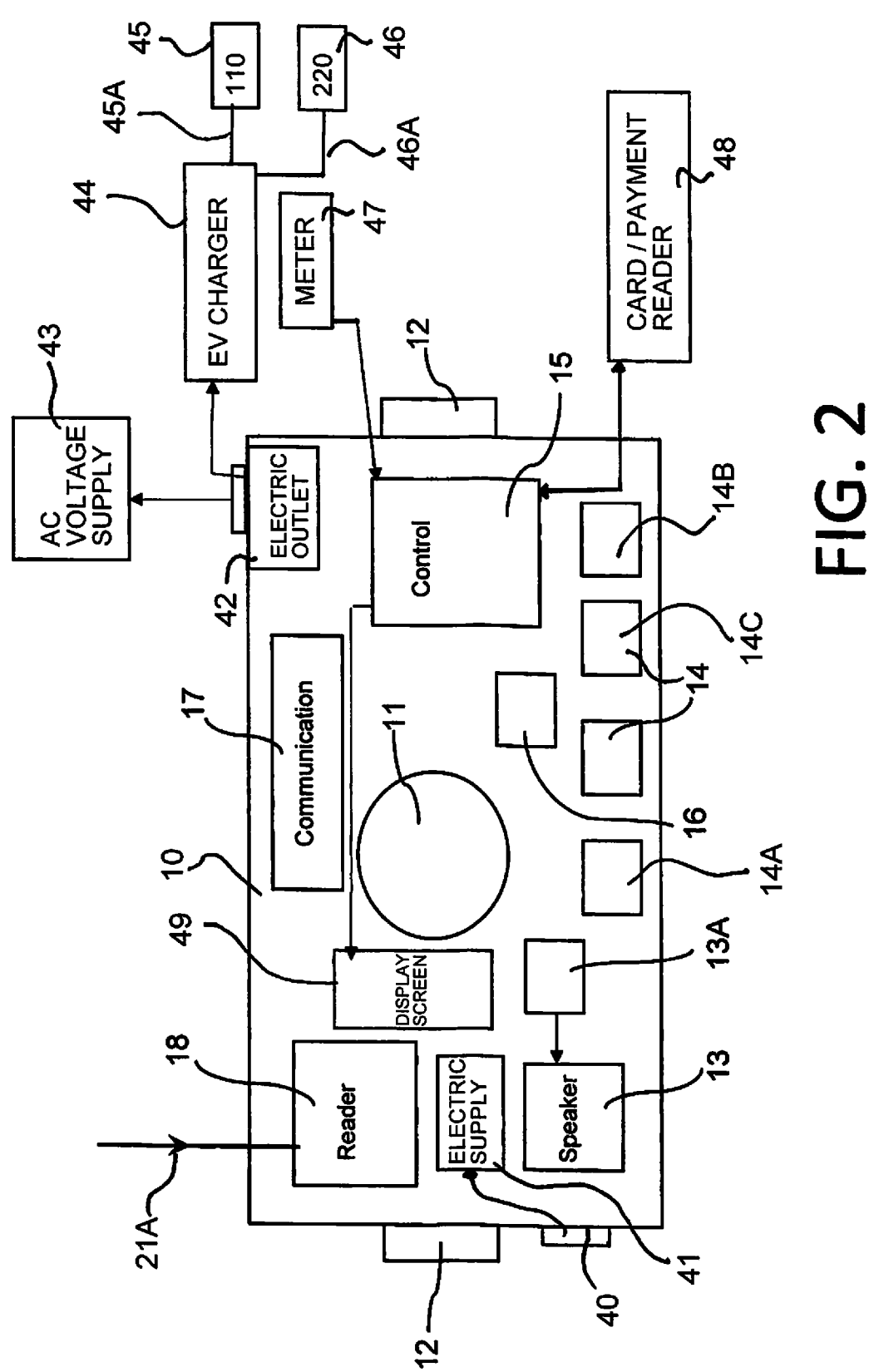
FIG. 2 is a schematic illustration of the components of the apparatus itself for use in the system of FIG. 1

As shown in FIG. 2, the device comprises a housing 10 containing proximity sensors 12, a video camera 11, warning lights 14 and a broadcast speaker 13 operated by a driver 13A.

Inside the device, there is provided a battery 16, a processor or control unit 15, a communications device 17 for communication with a cell phone system using a communications app and an RFID FOB reader 18.

The camera 11 is constantly active, streaming live online and connected for nonstop online viewing. The device has its own APP to send constant messages and video to the authorized parking stall user.

The proximity sensors 12 are always active and aim forward and outwards. One aims to the right at a 60 degree angle from the wall or guard rail and the other aims to the left at a 120 degree angle. Thus, both sensors 12 are constantly detecting when a motor vehicle approaches from straight on, or from the left or right of the parking stall.

The sensors 12 supply input signals to the control device 15 which is programmed to determine whether a vehicle has interrupted the sensors briefly, whether the vehicle is stationary, or whether the vehicle is getting closer to the sensors and remains stationary for more than 5 seconds. As a vehicle approaches, the micro processor 15 determines the amount of seconds one or both of the proximity sensors remain in detection mode. If the vehicle or driver contains or carries a remote FOB with the proper code to match the stored code at the remote FOB reader 18 inside the device, then the device will remain silent and allow the authorized vehicle to park.

If an unauthorized vehicle, that is there is no recognition of a properly coded remote FOB, in the path of both sensors remains stationary for more than 5 seconds, and has entered into a zone within 2 metres of the sensors, the device, through the APP, sends a live video stream through the communications interface 17 to the authorized user. The user then receives the question via their mobile device, "Do you recognize this vehicle?". The Owner then chooses YES or NO, if YES, then no activation of the alarm on the device. If NO, the blue and red LEDs flash, the APP sends an alarm notice to the parking stall owner, and the speaker emits a loud alarm sound. The alarm will be loud enough for the driver of the vehicle to hear even while inside his vehicle with the windows closed, this will then deter the driver from remaining in the parking stall. The speaker will also announce that live video is being streamed to the owner of the stall and to the tow company.

The device is programmed to recognize authorized vehicles if and when a properly coded remote FOB is within a distance of 4 metres from the remote FOB receiver. This FOB is an option, but not necessary for the function. If no FOB is present, the user will ALWAYS need to answer the APP to authorize the parking of ANY vehicle.

In one specific example, the device is a small metal enclosed box (approx. 150 mm×80 mm×50 mm) containing the two proximity sensors 12, the sound membrane (speaker) 13, one red LED and one green LED 14, a compartment housing a battery 16, the micro processor 15, the remote FOB receiver 18, the mini wireless camera 11. The device can be battery powered or may include an optional, solar panel (not shown) mounted on the outer top surface. The device also has an App for download when purchased.

Further as shown in FIG. 2, the device includes a power input which provides outside voltage to an electric supply 41 for powering the unit and for providing optional output power to an electrical outlet 42 controlled by the control unit. The outlet 42 can be operated to supply power to any one or more of a household voltage supply 44 and an EV charger 44 which can connect to at least first and second EV charging couplings 45 and 46, carried on connector lines 45A, 46A, at difference voltages (such as 110 and 220) for different types of electric vehicles. The EV charger is connected to a meter 47 which measures the power supplied to the attached vehicle when in use so as to calculate a charge to be applied to the user. This is controlled by the controller 15 and can be set at different rates depending on the user and the vehicle and the authorization provided. The control unit 15 also controls authorization for the use of the charging and outlet system and can activate this when authorized. In order to allow payment both for the parking and for the charging power used, a payment reader 48 is provided to allow scanning of a payment device. Or of course payment can be made through the communications app between the user and the system which allows the authorization to occur. The unit also includes a large display screen which dominates the front aspect of the unit as shown and described in relation to the embodiments in FIGS. 3 to 6. The illumination components 14, 14A and 14B include LEDs 14A and 14B which can flash under control of the control unit to communicate visually to local persons and also include lasers 14 for transmitting beams to define ends of the parking stall by illuminated markings on the ground or other local elements.

Figure 1:
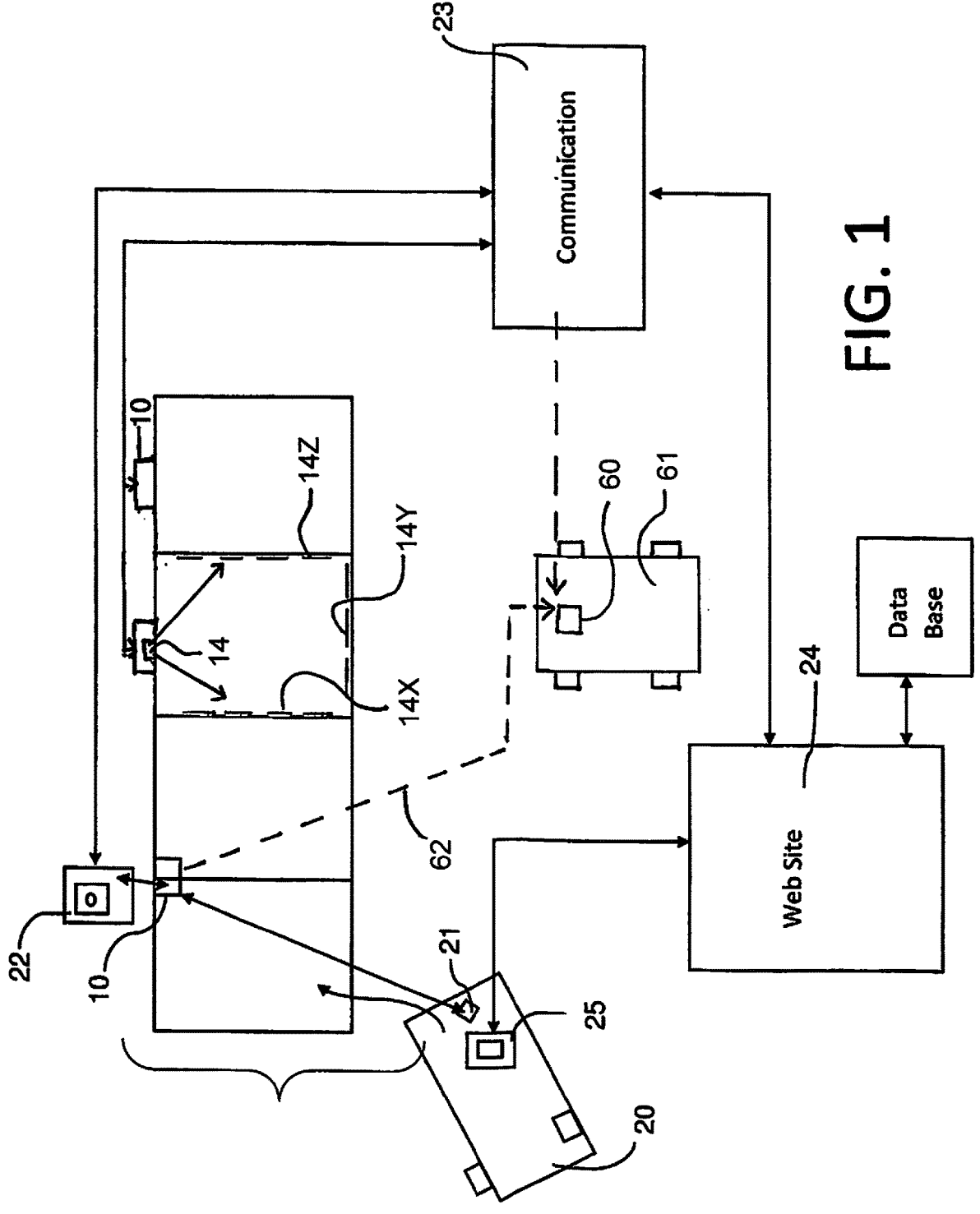
FIG. 1 is a schematic plan view of an apparatus according to the present invention in association with a web site and internet communication system for use in a parking system according to the present invention.

Turning now to FIG. 1, the device 10 is mounted at the junction between two stalls of an array of stalls for monitoring both stalls, if suitable. However one device per stall can be provided where the stalls are individually assigned to authorized users.

In this arrangement, the proximity or motion sensors 12 detect the presence of a vehicle 20 which may contain a FOB 21 or other short range communication device for communicating with a reader antenna 21A on the housing for detecting whether the vehicle is authorized.

The device can also communicate using the short-range communication system 17 with an adjacent smart phone 22 for providing set up information including recorded messages.

The system also allows communication between the device 10 and an internet communication system and through that communication system to a web site 24. Communication can be through WIFI and internet protocols or through mobile telephone technology. Where cell phone technology is used, the unit can be easily connected to cell systems by providing a SIM Card Reader on the processor 15, which will allow the Owner of the stall using the device to install a spare SIM Card from his/her Cell Phone Service Supplier linked to his/her existing cell phone plan.

The vehicle driver also typically will also have access to a mobile smart phone 25.

After information identifying the unauthorized vehicle is transmitted to the authorized user, the driver of the unauthorized vehicle can choose to pay for parking in the stall and if agreed will receive from the authorized user a signal indicating the unauthorized use is approved.

In the event that no authorized use is available, the control system provides an audible message to the driver confirming this through the speaker 13.

The housing 10 carries a readable QR code which can be scanned using the mobile phone 25 of the approaching unauthorized driver to enable the driver to obtain access to the web site 24 though the communication system 23.

The web site can be programmed by the authorized users of a set of the stalls associated with the system with information relating to authorized use of the parking stall or stalls. Thus each user on purchase of the device communicates through the app with the web site to store information about the availability of allowed parking. This could include a permanent ban. This could include some availability and particular hours where the stall can be used. This can be programmed for future days in advance if known or can be entered in real time if circumstances change in the short term.

In this way, when the system is used by many holders of authorized stalls, a data base 24A associated with the web site will hold data on the availability of all stalls in the system.

In this way, the web site is associated with a plurality of stalls, at a single parking site or at many such sites, each having an associated control apparatus where the web site contains and provides data to a customer relating to any one or more of the associated stalls where authorized use can be purchased. Thus a vehicle driver becomes a potential customer rather than just an unauthorized user and can receive through the app details of all stalls where authorized use can be purchased. Thus the web site contains and provides data to the customer relating to an approved time of authorized use and non-availability of authorized use of one or more stalls. The customer therefore can choose a stall which best matches in available times the expected time of use by the customer. Using conventional mapping technology, the location of the stalls can be provided to the customer through the app. Having therefore identified a suitable stall and the location of that stall the customer can move to and by identified by the control device at the stall. The identification can be done by the camera or by programming through the QR code reading system which identifies the customer and the stall at which the device is located. The potential customers also may be provided with identification FOBs which allow identification while not providing authorization to any particular stall unless confirmed through the web site and the app.

In this way, the web site communicates with the authorized user through the internet connection to determine whether authorized use is available.

The specific design of the housing can take many forms and can be manufactured from different materials. The device will have, both, a wired and solar powered version and each will be preferably made of metal.

When an unauthorized vehicle is in the stall, an alarm will sound, red light flashing, and the stall Owner will be notified (when wi-fi available). When an authorized vehicle is in the stall, no alarm and the green light flashes.

The device can contain the following hardware:

Raspberry Pi 4, running Raspian Buster

WIFI, Bluetooth and SIM Card communication

5MP 1080p HD camera for object recognition

A FOB receiver connected to a Raspberry I/O

An ultrasonic sensor or proximity sensor to detect any object in parking stall should camera stop working.

A Re-chargeable battery to power all components.

A 1" speaker to deliver warning message to violator.

Red and green light for visual warning.

Solar panel to recharge battery.

A FOB transmitter in car.

Polycarbonate cover over the solar panel, red/green light openings and QR code opening.

1" diameter barrel lock.

A backside mounting plate.

The device preferably is mounted between a min. of 3 feet from the ground to a maximum of 5 feet?

The device website will show the location of devices on the online map which Owners have signalled as "Available for parking" within a general proximity to where the potential client is searching for a vacant parking stall.

On the housing, a larger hole on the bottom is for the speaker and a smaller hole is for a barrel lock. One hole on the front of each is for the camera and the other for the sensor. The square knockouts are for the QR code. One version has 2 square knockouts. This device can be used for 2 parking stalls, each parking stall needs its own code. The square knockout on the back of each shell is for the eventual mounting plate. Each device has a clear Polycarbonate interior sleeve covering the opening for solar panels and knockouts are used for the indicate lights which show an "X" to indicate denial of entry and a "Checkmark" to indicate acceptance of entry.

Other arrangements do not offer is for the private Owner of the stall to make money. Owners of the present device can choose to be part of its entire online ecosystem to benefit monetarily. Further to the QR code directing a potential client to pay for parking, using the device allows private parking stall Owners, not just commercial parking lot landlords, to make money from people choosing to park in their private stalls.

Figures 3, 4:
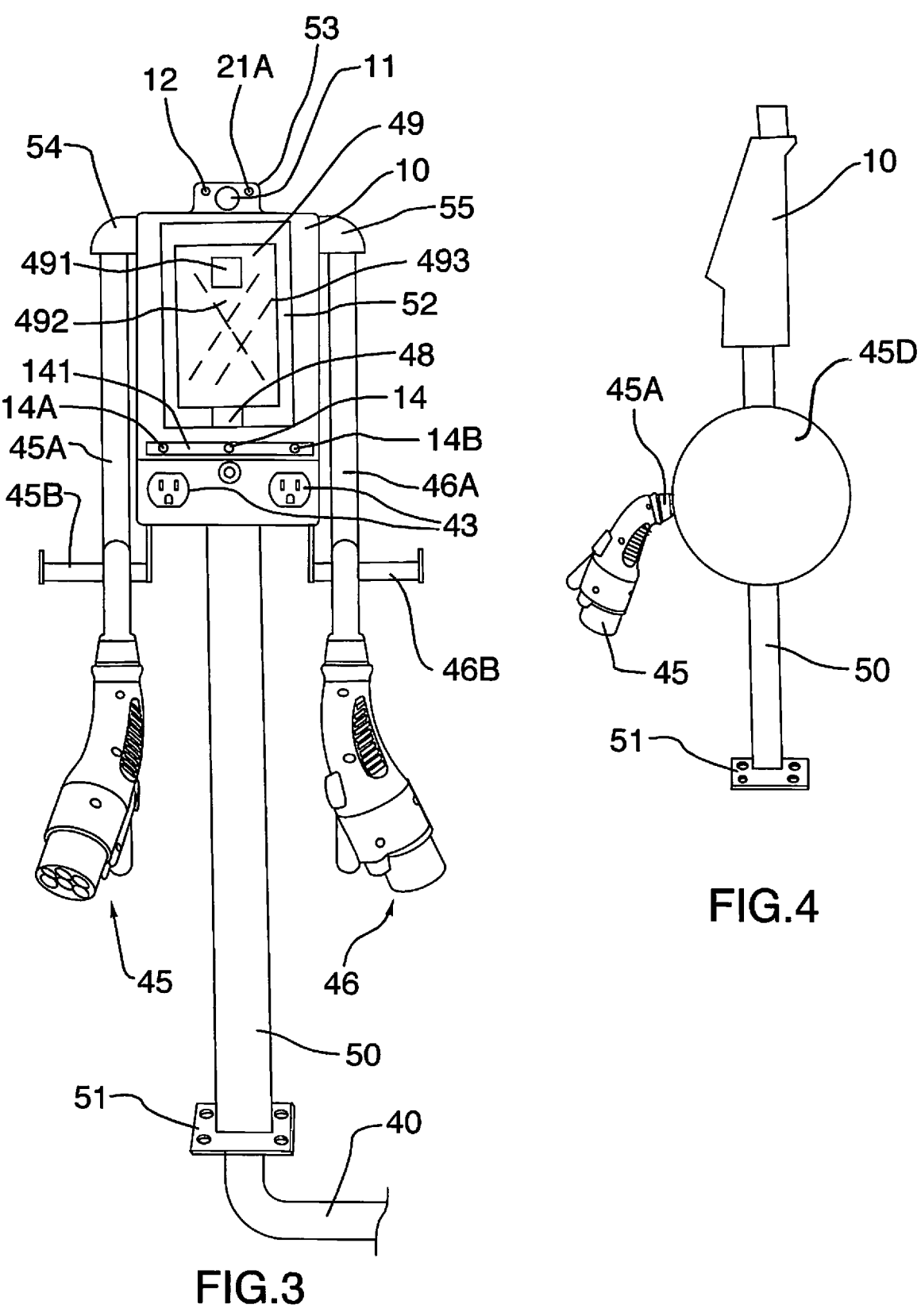
FIG. 3 is a front elevational view of one embodiment of the apparatus itself for mounting at the parking stall for use in the system of FIG. 1.
FIG. 4 is a side elevational view of the apparatus of FIG. 3.

Turning now to the details of one specific embodiment as shown in FIGS. 3 and 4, the apparatus comprises a generally rectangular housing 10 mounted on a suitable support which in this arrangement comprises a post 50 carried on a mounting base 51 to be attached to the ground. In this embodiment the housing is mounted on a post preferably centrally of the parking stall but it will be appreciated that wall mounting can be provided and that the location may vary so that the front face may require to be oriented in a different direction.

The rectangular housing includes a front face 52 the majority of which forms a prominent display screen 49 readily visible from the driving seat of a vehicle. On top of the housing is provided a raised section 53 which contains the camera 11, the reader 12 and the receiver 21A. these are arranged to face forwardly over the top of the display.

On the front face under the display are located the LEDs 14A and 14B and the laser projector 14. These are carried on a bar 141 across the front face again so as to be presented forwardly to the parking stall and the vehicle therein.

Underneath the bar 141 is provided two household electrical outlets 43 to provide auxiliary power to an accessory such as a block heater in cold temperatures or a vacuum cleaner.

On each side of the housing is provided an outlet shield 54, 55 each of which covers a respective one of the lines 45A and 46A of the electrical outlet 42 defining the charging system. Thus the charging system includes at least one connecting lead 45A and an outlet coupling 45 for connection to a battery of an electric vehicle. In the arrangement shown there are two leads 45A and 46A for two separate parking stalls or for different connections for different vehicles having different receptacles and/or voltage requirements.

The housing 10 as previously described and shown in FIG. 2 contains the various components for operating the charging system including the control system includes the usage meter 47 for detecting an amount of electrical energy used in charging the battery. Also the card payment reader is provided on the housing as shown at 48 at a suitable location for the user to scan the payment device.

Thus as better shown in FIG. 2, the control system 15 communicates with the usage meter 47 for measuring an amount of electricity consumed and controls an amount the customer pays at the payment reader 48, which can be paid when charging is complete or upon exiting the parking stall.

The electric outlet includes supplies for: the AC voltage outlet 43, a 110 v electric vehicle (EV) charger outlet 45 and a 220 v EV charger outlet 46. This can also includes an outlet for a Tesla Supercharger adapter which may be provided by adapting one of the connectors 45, 46.

Each lead 45A, 46A extends downwardly from the cover 55 so as to be connected to and extend from the housing to the outlet coupling 45, 46. A suitable support for the depending lead is provided as support 45B and 46B for the lead. In FIG. 3 this is shown as a simple support bracket over which the lead is draped. In Figure the support comprises a reel 45D for winding in and releasing the lead 45.

In FIG. 5 the control unit is arranged to physically and automatically enable EV charging for a vehicle by way of a robotic arm shown schematically only at 45E. This arm is arranged to operate the connecting lead and the outlet coupling so as to extend, attach, charge, detach and retract automatically using control and linkage systems apparent to a person skilled in this art.

As shown in FIG. 1 there can be provided a transducer 80 for wireless charging of EV batteries for example by induction, microwave or laser. The location of the wireless transducer or power emitter is physically separate from the main housing unit, and can for example be mounted on the parking stall as a ground pad directly underneath the car for cooperation with a receiver 81 on the vehicle.

The laser projector which can be provided as a single element generating two beams or as two separate projectors 14 thus act a light projector system which projects at least one line 14X on the ground at the parking stall displaying on the ground an extent of the parking stall. This is shown in FIG. 1 where the projector 14 generates lines 14X, 14Y and 14Z defining ends and/or sides of the extent of the parking stall. As shown the lines define both sides and one end but the arrangement can be tailored to define two ends along a roadway depending on the shape and location of the stall. Thus the light projector system can project two distinct lines on the ground at the parking stall displaying ends of the parking stall. This projection is extremely useful when there are no defined parking stall lines due to paint deterioration, snow coverage, gravel or unpaved areas where no lines exist.

The LEDs 14A and 14B include at least one colored LED for use as a warning signal and at least one infrared LED for the camera 11 for enhancing night vision.

The arrangement herein also can be programed so that the control system is arranged to provide instructing communications to the control unit 60 of an autonomous vehicle 61 for location of the autonomous vehicle within the parking stall. As the control unit 15 necessarily has the parameters of the location of the stall programed therein, the control unit is arranged to provide instructing communication through a communication link schematically indicated at 62 for slowly guiding the autonomous vehicle to be accurately lined up within the parking stall. In this way the control unit is arranged to use AI and other built-in sensors to communicate with the autonomous car's on-board computer enabling a perfectly, physically aligned park within the stall parameters. Without this feature, the autonomous car might park too much to one side or the other possibly creating a hazard when opening a door. Furthermore, the control unit can be arranged to purposely align the autonomous car more to one side of the stall to avoid an obstacle or similar on the other side.

To provide more effective communication with the user who is typically a driver sitting in an automobile, the communication from the control unit 15 is primarily carried out using a large video screen for displaying information to the occupant of the vehicle. The control unit is arranged to display on the video screen at the required times a QR Code 491, a large "green checkmark" 493 when authorized to park or a large "red X" 492 when not authorized. The control unit can also be arranged to display on the video screen streaming advertisements when the presence of a person or vehicle is detected. The programmed artificial intelligence of the control unit includes real-time video playback simultaneously on the screen and on the APP. This video is utilized as a security measure when a person is detected in the parking space, but not for the purpose of parking a vehicle. The video screen 49 is also a touchscreen with 2-finger zoom and scrolling.

In FIGS. 5 and 6 is shown an alternative arrangement for use at a single stall with a single charging head 45 which is carried on the post 50 at an opening 73 raised from the base and adjacent the front face of the housing. This allows the charging head to be carried on an arm 45E which can move the head to the required locations on a detected vehicle. In this arrangement the cable 45A is supplied by a reel 72 carried on an axle 71 within a sealed container 70 under the base of the post so as to pass through the hollow interior of the post to the opening 73.

Thus one arrangement includes the automatic ejection of the connector head to be grabbed by the hand of the operator and then physically plugged by hand into the electronic vehicle (EV). The other arrangement shown in FIG. 5 includes the charger cable as part of a robotic arm 45E which automatically extends and plugs into the EV, then automatically retracts either when charging is complete or on demand from the APP. The EV is required to have an appropriate charger receptacle to cooperate with this arrangement.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An apparatus for charging a vehicle with electricity by an operator of the vehicle, the apparatus comprising:
   a housing constructed and arranged so as to be mounted at a mounting point adjacent the vehicle;
   the housing including an upstanding post having a post base arranged to be affixed to a support surface adjacent the vehicle;
   and an electrical outlet having a charging system with a connecting lead and a charging head for connection to an inlet coupling of the vehicle for charging a battery of the vehicle;
   the connecting lead being mounted and contained within the post;
   the connecting lead including a lead supply device at the post for supplying a length of the connecting lead for movement of the charging head from a storage position at the post to charging position at the vehicle;
   the housing including an opening at which the charging head is located;
   wherein the charging head when located at the opening is contained within the housing so as to be protected within the housing;
   and a control system arranged to operate the connecting lead and the charging head to automatically eject the charging head from the opening to be grabbed by a hand of the operator and physically plugged by hand into the inlet coupling of the vehicle;
   the control system further being arranged to operate the connecting lead and the charging head to automatically retract the connecting lead and the charging head back into the opening when charging is complete.

2. The apparatus according to claim 1 wherein the control system includes a usage meter for detecting an amount of electrical energy used in charging the battery.

3. The apparatus according to claim 2 wherein the control system communicates with the usage meter for measuring an amount of electricity consumed and controls an amount the customer pays.

4. The apparatus according to claim 1 wherein the charging head includes 3-way supply for: an AC voltage outlet, a 110v electric vehicle (EV) charger outlet and a 220v EV charger outlet.

5. The apparatus according to claim 4 wherein the 3-way supply includes a Tesla Supercharger adapter.

6. The apparatus according to claim 1 wherein the lead supply device at the post comprises a reel located within a container at a position underneath the post base and hence underneath the ground surface.

7. An apparatus for charging a vehicle with electricity by an operator of the vehicle, the apparatus comprising:
   a housing constructed and arranged so as to be mounted at a mounting point adjacent the vehicle;
   the housing including an upstanding post having a post base arranged to be affixed to a support surface adjacent the vehicle;
   and an electrical outlet having a charging system with a connecting lead and a charging head for connection to an inlet coupling of the vehicle for charging a battery of the vehicle;
   the connecting lead being mounted and contained within the post;
   the connecting lead including a lead supply device at the post for supplying a length of the connecting lead for movement of the charging head from a storage position at the post to charging position at the vehicle;

the housing including an opening at which the charging head is located;

wherein the charging head when located at the opening is contained within the housing so as to be protected within the housing;

a control unit arranged to operate the connecting lead and the charging head to automatically eject the charging head from the opening to be grabbed by a hand of the operator and physically plugged by hand into the inlet coupling of the vehicle;

the control unit further being arranged to operate the connecting lead and the charging head to automatically retract the connecting lead and the charging head back into the opening when charging is complete;

and a heating element inside the housing to maintain the connecting lead and the charging head at a functioning temperature.

8. The apparatus according to claim 7 wherein the support surface of the post base is a ground surface; and wherein the lead supply device at the post comprises a reel located within a container at a position underneath the post base and hence underneath the ground surface.

9. An apparatus for charging a vehicle with electricity by an operator of the vehicle, the apparatus comprising:

a housing constructed and arranged so as to be mounted at a mounting point adjacent the vehicle;

the housing including an upstanding post having a post base arranged to be affixed to a support surface adjacent the vehicle;

and an electrical outlet having a charging system with a connecting lead and a charging head for connection to an inlet coupling of the vehicle for charging a battery of the vehicle;

the connecting lead being mounted and contained within the post;

the connecting lead including a lead supply device at the post for supplying a length of the connecting lead for movement of the charging head from a storage position at the post to charging position at the vehicle;

the housing including an opening at which the charging head is located;

wherein the charging head when located at the opening is contained within the housing so as to be protected within the housing;

a control unit arranged to operate the connecting lead and the charging head to automatically eject the charging head from the opening to be grabbed by a hand of the operator and physically plugged by hand into the inlet coupling of the vehicle;

the control unit further being arranged to operate the connecting lead and the charging head to automatically retract the connecting lead and the charging head back into the opening when charging is complete;

wherein the support surface of the post base is a ground surface; and wherein the lead supply device at the post comprises a reel located within a container at a position underneath the post base and hence underneath the ground surface.

* * * * *